United States Patent
Ozeki et al.

(10) Patent No.: US 9,074,064 B2
(45) Date of Patent: Jul. 7, 2015

(54) CARBON FIBER PREPREG, METHOD FOR PRODUCING SAME AND CARBON FIBER REINFORCED COMPOSITE MATERIAL

(75) Inventors: Yuki Ozeki, Nomi (JP); Hiroyuki Takagishi, Nomi (JP); Go Kojitani, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 13/993,223

(22) PCT Filed: Dec. 1, 2011

(86) PCT No.: PCT/JP2011/077750
§ 371 (c)(1),
(2), (4) Date: Jun. 11, 2013

(87) PCT Pub. No.: WO2012/081407
PCT Pub. Date: Jun. 21, 2012

(65) Prior Publication Data
US 2013/0274413 A1  Oct. 17, 2013

(30) Foreign Application Priority Data

Dec. 13, 2010  (JP) .................................. 2010-276746
Feb. 24, 2011  (JP) .................................. 2011-038043

(51) Int. Cl.
| B32B 9/00 | (2006.01) |
| B32B 27/00 | (2006.01) |
| B05D 3/12 | (2006.01) |
| D01H 13/30 | (2006.01) |
| D01G 29/00 | (2006.01) |
| C08K 7/06 | (2006.01) |
| C08J 5/04 | (2006.01) |
| C08J 5/24 | (2006.01) |
| B29C 70/50 | (2006.01) |
| B29K 307/04 | (2006.01) |
| B29K 105/08 | (2006.01) |

(52) U.S. Cl.
CPC . *C08K 7/06* (2013.01); *C08J 5/042* (2013.01); *C08J 5/24* (2013.01); *B29C 70/50* (2013.01); *B29K 2307/04* (2013.01); *B29K 2105/0872* (2013.01)

(58) Field of Classification Search
None
See application file for complete search history.

(56) References Cited

U.S. PATENT DOCUMENTS

| 5,137,594 A * | 8/1992 | Asada et al. ............... 156/307.4 |
| 6,670,006 B1 | 12/2003 | Sugimori et al. |
| 8,490,253 B2 * | 7/2013 | Junker et al. ................. 19/66 R |
| 2002/0009588 A1 * | 1/2002 | Matsuhisa et al. ........... 428/367 |
| 2004/0213952 A1 | 10/2004 | Takemura et al. |
| 2009/0110872 A1 | 4/2009 | DiFonzo et al. |
| 2010/0092770 A1 * | 4/2010 | Wadahara et al. ............ 428/339 |

FOREIGN PATENT DOCUMENTS

| JP | 60-009962 A | 1/1985 |
| JP | 61-083006 A | 4/1986 |
| JP | 61-106634 A | 5/1986 |
| JP | 03-146736 A | 6/1991 |
| JP | 08-020654 A | 1/1996 |
| JP | 08-020708 A | 1/1996 |
| JP | 09-087359 A | 3/1997 |
| JP | 2000-086784 A | 3/2000 |
| JP | 2000-198112 A | 7/2000 |
| JP | 2000-273224 A | 10/2000 |
| JP | 2002-069754 A | 3/2002 |
| JP | 2004-099814 A | 4/2004 |
| JP | 2005-161797 A | 6/2005 |
| JP | 2009-292976 A | 12/2009 |
| JP | 2009-292977 A | 12/2009 |
| TW | 515817 B | 1/2003 |
| WO | 2010/035453 * | 4/2010 |

OTHER PUBLICATIONS

Machine translation of Kozai et al., Jun. 23, 2003, JP 2005-161797, pp. 1-30.*
International Search Report for PCT/JP2011/077750 dated Mar. 6, 2012.
Notice of Opinion on Examination issued Mar. 23, 2015, in Taiwan Patent Application No. 100144972, with English translation.

* cited by examiner

*Primary Examiner* — Susannah Chung
*Assistant Examiner* — Robert T Butcher
(74) *Attorney, Agent, or Firm* — Birch, Stewart, Kolasch & Birch, LLP (57) ABSTRACT

A carbon fiber prepreg includes carbon fiber bundles containing numerous carbon fiber single yarns and a matrix resin impregnated in the carbon fiber bundles, the value of the coefficient of variation, displayed as a percentage, of the number of the carbon fiber single yarns contained per unit area being 10% or less, wherein in each unit area, the width and the depth from the surface of the carbon fiber prepreg in the cutting plane when the carbon fiber prepreg is cut at right angles to the array direction (direction of the fiber axis) of the carbon fiber bundles are 100 μm and 30 μm respectively. A carbon fiber prepreg may have a projected area of a carbon fiber single yarn which has a fiber orientation angle of 0°±3° or more is 2% or less of the projected area of all carbon fiber single yarns.

17 Claims, 2 Drawing Sheets

Fig. 4

CARBON FIBER PREPREG, METHOD FOR PRODUCING SAME AND CARBON FIBER REINFORCED COMPOSITE MATERIAL

TECHNICAL FIELD

The present invention relates to a carbon fiber prepreg which comprises carbon fiber bundles composed of numerous carbon filaments and a matrix resin, as well as a manufacturing method therefor. The present invention also relates to a carbon fiber reinforced composite material obtained by molding a carbon fiber prepreg of the present invention. A carbon fiber prepreg of the present invention makes it possible to provide a carbon fiber reinforced composite material having good appearance quality.

BACKGROUND ART

Conventional carbon fiber prepregs comprising carbon fiber bundles composed of numerous carbon filaments and a matrix resin were, even when their constituent carbon fiber bundles had been drawn together in one direction, plagued with the presence of localized aggregation of the carbon filaments within the carbon fiber bundles, localized positional fluctuation of the carbon fiber bundles, localized twisting of the carbon filaments within the carbon fiber bundles, and the like on their surfaces. As a result, moldings (carbon fiber reinforced composite materials) molded from them had poor design performance from the viewpoint of uniformity in the external appearance of their surfaces.

Unevenness of dispersion of the carbon filaments resulting from a localized aggregation of the carbon filaments within the carbon fiber bundles generate a fluctuation in color shade on a surface of a molding. Positional fluctuation, twisting and other forms of fluctuation in the orientation of the carbon filaments, on the other hand, cause an unpleasant feeling to people looking at such a surface of the molding because it changes its appearance according to the incidence angle of light falling on the surface. Often described with such words as "visual irritation", "glistening" and "fluctuation", such an unpleasant feeling annoys people, giving rise to calls for moldings free of such defects.

Since this unpleasant feeling stems from visible unevenness on the surfaces of moldings, attempts have been made to disguise them through the application of a coat to their surfaces and other techniques. However, such an additional surface treatment is problematic in that it increases the weight of moldings, as well as failing to make the most of the design advantage of carbon fiber. The application of a transparent coat (clear coating), which leaves the surface of the molding fully visible, on the other hand, had no effect on the above unpleasant feeling, and this has led to calls to eliminate it through an improvement in design performance.

As can be seen from patent documents 1 to 11, there are conventional techniques to obscure unevenness, such as controlled resin flow based on the restriction of the flow of the resin during the molding process and covering of the mold surface with a translucent glass scrim cloth. However, these are all based on an improvement in molding performance in terms of managing the generation of defects that greatly impair external appearance. Namely, rather than improving the design performance of carbon fiber reinforced composite materials, they merely alleviate molding defects.

CITATION LIST

Patent Literature

Patent document 1: US 2009/0110872 A1
Patent document 2: JP 2009-292977 A
Patent document 3: JP 2009-292976 A
Patent document 4: JP 2004-099814 A
Patent document 5: JP 2002-069754 A
Patent document 6: JP 2000-273224 A
Patent document 7: JP 2000-198112 A
Patent document 8: JP 2000-086784 A
Patent document 9: JP 09-087359 A
Patent document 10: JP 08-020708 A
Patent document 11: JP 08-020654 A

SUMMARY OF INVENTION

Technical Problem

The present invention aims to provide carbon fiber prepregs that are suitable for producing carbon fiber composite materials free of visible surface unevenness, namely carbon fiber prepregs having high uniformity in external appearance, and a manufacturing method therefor, as well as carbon fiber reinforced composite materials having good appearance quality.

Solution to Problem

One type of carbon fiber prepreg of the present invention designed to achieve the aim of the present invention is as described below.

A carbon fiber prepreg comprising carbon fiber bundles composed of numerous carbon filaments and a matrix resin impregnated into the carbon fiber bundles wherein a percentage variation coefficient of the number of the carbon filaments contained in a unit area having the depth of 30 μm from a surface of the carbon fiber prepreg and the width of 100 μm in a cut surface formed by cutting the carbon fiber prepreg perpendicularly to the orientation of the carbon fiber bundles is 10% or less.

Here, the orientation of carbon fiber bundles means the longitudinal direction of carbon fiber bundles, namely fiber axis direction.

Hereinafter, this carbon fiber prepreg may be referred to as the first carbon fiber prepreg.

Another type of carbon fiber prepreg of the present invention designed to achieve the aim of the present invention is as described below.

A carbon fiber prepreg which comprises carbon fiber bundles composed of numerous carbon filaments and a matrix resin impregnated into the carbon fiber bundles, wherein the projected area of the carbon filaments having a fiber orientation angle of 0°±3° or more in absolute value thereof is 2% or less of the projected area of all of the carbon filaments.

Hereinafter, this carbon fiber prepreg may be referred to as the second carbon fiber prepreg.

In the first carbon fiber prepreg, it is preferable that the projected area of the carbon filaments having a fiber orientation angle of 0°±3° or more in absolute value thereof is 2% or less of the projected area of all of the carbon filaments.

In the first carbon fiber prepreg or the second carbon fiber prepreg, it is more preferable that the projected area of the carbon filaments having a fiber orientation angle of 0°±3° or more in absolute value thereof is 0.8% or less of the projected area of all of the carbon filaments.

In the first carbon fiber prepreg or the second carbon fiber prepreg, it is preferable that the major axis/minor axis ratio of the carbon filaments is in the range of 1.00 to 1.10 and that the degree of surface smoothness of the carbon filaments is 20 or less.

In the first carbon fiber prepreg or the second carbon fiber prepreg, it is preferable that the surface Si/C atomic ratio of the carbon filaments is 0.01 or less.

In the first carbon fiber prepreg or the second carbon fiber prepreg, it is preferable that a unit area weight of the carbon fibers in the carbon fiber prepreg is in the range of 30 g/m$^2$ to 100 g/m$^2$.

In the first carbon fiber prepreg or the second carbon fiber prepreg, it is preferable that the matrix resin content of the carbon fiber prepreg is in the range of 15 mass % to 50 mass %.

In the first carbon fiber prepreg or the second carbon fiber prepreg, it is preferable that the matrix resin is an epoxy resin composition.

The carbon fiber prepreg manufacturing method of the present invention designed to achieve the aim of the present invention is as described below.

A carbon fiber prepreg manufacturing method for producing a carbon fiber prepreg of the present invention comprising a step for widening the carbon fiber bundles in the range of 80 to 98% of the target width prior to the impregnation of the carbon fiber bundles with the matrix resin by means of the drawing together of the numerous carbon filaments contained in the carbon fiber bundles by applying a tension in the range of 0.3 to 6 cN/tex to each carbon fiber bundle.

In this carbon fiber prepreg manufacturing method, it is preferable that the tension applied to the carbon fiber bundles is in the range of 0.5 to 6 cN/tex.

In this carbon fiber prepreg manufacturing method, it is preferable that the degree of fiber entanglement of the carbon fiber bundles is 10 or less.

In this carbon fiber prepreg manufacturing method, it is preferable that the drape value of the carbon fiber bundles is in the range of 5 cm to 18 cm.

The carbon fiber reinforced composite material of the present invention designed to achieve the aim of the present invention is as described below.

A carbon fiber reinforced composite material produced by curing the matrix resin existing in the carbon fiber prepreg of the present invention or the carbon fiber prepreg produced by the carbon fiber prepreg manufacturing method of the present invention.

The target width associated with the step to widen the carbon fiber bundles to, on average, 80 to 98% of the target width in advance is the width obtained by dividing the whole width of the prepreg divided by the number of carbon fiber bundles. Namely, the target width means the width per carbon fiber bundle of the prepreg.

It is possible to obtain a carbon fiber prepreg in which the carbon fiber bundles have been uniformly spread across the whole width of the prepreg by impregnating the carbon fiber bundles with a heated resin after widening the carbon fiber bundles to, on average, 80 to 98% of the target width.

The percentage variation coefficient of the number of the carbon filaments contained in a unit area having the depth of 30 μm from a surface of the carbon fiber prepreg and the width of 100 μm in cut surface formed by cutting the carbon fiber prepreg perpendicular to the orientation of the carbon fiber bundles (fiber axis direction), (which may be abbreviated as the "CV value" hereinafter), and the fiber orientation angle, along with the fluctuation therein, are measured using the methods described below.

<CV Value of the Number of the Carbon Filaments>

The carbon fiber prepreg used for the measurement of the CV value of the number of the carbon filaments is prepared by leaving the prepreg to stand at 50° C. for 2 weeks, then at 80° C., 110° C., 130° C. and 180° C. in that order for 30 minutes each, all under normal pressure, to cure the matrix resin without letting it flow.

Out of this measurement prepreg, 10 mm×10 mm square samples are cut with the orientation of the fibers (fiber axis) designated as their first axis. A total of 20 samples are taken uniformly across the whole width of the prepreg. Each sample is then cut perpendicularly to its first axis (fiber axis) to obtain 20 measurement samples. Each of the obtained measurement samples is embedded in a resin to fix its position in such a manner as to keep the cut surface visible, and the embedding resin is cured. The surface of the cured resin through which the cut surface of the embedded measurement samples is visible is polished with #800 sandpaper to prepare a measurement piece. The polished surface of the prepared measurement piece (i.e. the cut surface of the prepreg) is photographed using a VHX-500 microscope from Keyence Corporation.

Photographing conditions are as follows: lens: VH-Z100R, field of view: 1.02×0.76 mm, magnification: 300 times, resolution: 1600×1200 pixels, and number of measuring point: one per measurement piece, taken by photographing whichever cut surface was arbitrarily chosen.

On each of the obtained 20 photographs, the number of the carbon filaments contained in a unit area (width of 100 μm×depth of 30 μm from the surface) was counted, and the percentage variation coefficient of the number of the carbon filaments contained in the unit area, namely the CV value, is calculated for the 20 photographs obtained.

<Fiber Orientation Angle and Fluctuation Therein>

Out of the measurement prepreg, 200 mm×200 mm square samples are cut with the orientation of the fibers (fiber axis) designated as their first axis. A total of five samples are taken uniformly across the whole width of the prepreg for use as measurement pieces.

If the obtained measurement pieces are lined with release paper, they are immersed in water to remove the surface air after the release paper is removed. In this regard, alcohol, a surface active agent or the like may be added to water to facilitate the removal of surface air.

Each of the prepared measurement pieces is photographed using a VHX-500 microscope from Keyence Corporation by placing it in such a manner that the average orientation of the carbon filaments coincides with the 0° direction (direction of the first axis).

Photographing conditions are as follows: lens: VH-Z20R, field of view: 3.04×2.28 mm, magnification: 100 times, resolution: 1600×1200 pixels, and number of measuring point: five per measurement piece, taken by photographing areas around five randomly selected points on whichever cut surface was arbitrarily chosen.

Using the image processing library HALCON (Ver. 8.0) from MVTec, the obtained photographs are subjected to an image analysis in the following procedure to emphasize each individual carbon fiber yarn: noise removal, contour enhancement, binarization, enlargement/contraction and thinning. The software then calculates the average fiber orientation direction (0°) of the carbon filaments and, by calculation, identifies the carbon filaments that deviate from the calculated average fiber orientation direction (0°) by a certain angle (+3°) or more in absolute value thereof and have at least a certain length (150 pixels, equivalent to 0.285 mm), followed by a calculation of the fluctuation in the orientation of the carbon filaments using formula (1).

[(Projected area of the fibers having angle of ±3° or more in absolute value thereof and length of 150 pixels or more)/Projected area of all of the fibers having length of 150 pixels or more]×100[%]   formula (1)

The average of all 25 measurements obtained is taken as the fluctuation in the fiber orientation angle of the carbon filaments.

Advantageous Effects of Invention

Carbon fiber prepregs of the present invention have good uniformity in the orientation of the carbon filaments. Carbon fiber composite materials molded from them have excellent design performance in terms of surface appearance (based on improved design). Namely, carbon fiber composite materials molded from carbon fiber prepregs of the present invention have an observable, excellent design advantage in external appearance, thanks to very little unevenness in the cross-sectional distribution of the carbon filaments and fluctuation in their orientation. Carbon fiber reinforced composite materials obtained in this manner greatly enhance the value of products whose external appearance is directly observable, while proving useful in the lightweighting of products by, for example, eliminating the need for surface coating.

DESCRIPTION OF EMBODIMENTS

The carbon fiber prepregs of the present invention are further described using embodiments.

The carbon fiber prepregs of the present invention are characterized by the fact that the CV value of the carbon filaments including in the unit area as measured using the method described above is 10% or less.

Setting the CV value of the carbon filaments in the unit area to 10% or less makes it possible to prevent uneven distribution specks of the carbon filaments in the prepregs and moldings and obtain moldings having good external appearance, free of color shade fluctuation specks even when a clear coat aimed at making the most of the design advantage of carbon fiber is applied. From this viewpoint, it is preferable that the CV value of the carbon filaments is 8% or less.

Furthermore, the carbon fiber prepregs of the present invention are characterized by the fact that the projected area of the carbon filaments having a fiber orientation angle of 0°±3° or more in absolute value thereof is 2% or less, preferably 0.8% or less, of the projected area of all of the carbon filaments.

Setting the projected area of the carbon filaments having a fiber orientation angle of 0°±3° or more in absolute value thereof to 2% or less, preferably 0.8% or less, of the projected area of all of the carbon filaments makes it possible to maintain the uniformity of the external appearance of the prepreg. At the same time, this makes it possible to prevent abnormality in the uniformity of external appearance due to carbon fiber yarn orientation fluctuation specks after the prepreg is molded into a composite material and thus obtain moldings having good external appearance without the need for correction under a relatively large range of molding conditions.

From the viewpoint of achieving the dual goal of obtaining moldings having good external appearance, free of color shade fluctuation specks, and preventing abnormality in the uniformity of external appearance due to the carbon filaments orientation fluctuation specks, it is preferable that the CV value of the carbon filaments is 10% or less and that the projected area of the carbon filaments having a fiber orientation angle of 0°±3° or more in absolute value thereof is 2% or less of the projected area of all of the carbon filaments.

It is preferable that the carbon fiber prepregs of the present invention have a unit area weight of fiber in the range of 30 $g/m^2$ to 100 $g/m^2$, more preferably in the range of 40 $g/m^2$ to 80 $g/m^2$.

Setting the unit area weight of fiber to 100 $g/m^2$ or less not only facilitates the manufacture of moldings having a low unit area weight of fiber but also makes it possible to restrict the occurrence of fiber orientation fluctuation specks due to fiber movement in the thickness direction of the prepreg. From this viewpoint, it is more preferable that the unit area weight of fiber is 80 $g/m^2$ or less. On the other hand, setting the unit area weight of fiber to 30 $g/m^2$ or more makes it easier to maintain straightness of the carbon filaments when spreading them evenly. From this viewpoint, it is more preferable that the unit area weight of fiber is 40 $g/m^2$ or more.

It is preferable that the carbon fiber prepregs of the present invention have a matrix resin content in the range of 15 mass % to 50 mass %, more preferably in the range of 20 mass % to 40 mass %.

Setting the resin content to 15 mass % or more makes it easier to get the resin to be present uniformly on the surface of the produced molding. From this viewpoint, it is preferable that the resin content is 20 mass % or more. Setting the resin content to 50 mass % or less makes it possible to restrict the fluctuation of fiber orientation due to the fluidity of the resin during the molding process. From this viewpoint, it is preferable that the resin content is 40 mass % or less.

Although there are no particular, restrictions on the type of matrix resin used for the carbon fiber prepregs of the present invention, the use of a thermosetting resin is preferable.

Examples of a thermosetting resin include a polyester resin, vinyl ester resin, and epoxy resin. A curing agent, thickener, anti-shrinkage agent, etc. may be used with a thermosetting resin, and there are no particular restrictions in this regard. An epoxy resin is preferable as the thermosetting resin.

Concrete examples of an epoxy resin include a glycidyl ether obtained from polyol, glycidyl amine obtained from an amine containing two or more active hydrogen atoms, glycidyl ester obtained from polycarboxylic acid, and polyepoxide obtained by oxidizing a compound containing two or more double bonds in the molecule.

For instance, a bisphenol-type epoxy resin, such as a bisphenol A-type epoxy resin, bisphenol F-type epoxy resin and bisphenol S-type epoxy resin or tetrabromobisphenol A-type epoxy resin, a novolac-type epoxy resin, such as a phenol novolac-type epoxy resin or cresol novolac-type epoxy resin, a glycidyl amine type epoxy resin, such as tetraglycidyl diaminodiphenyl methane, triglycidyl aminophenol or tetraglycidyl xylene diamine, or a combination thereof is preferably used.

As a curing agent for such an epoxy resin composition, any compound containing an active group capable of reacting with an epoxy group may be used.

Examples of an amine-based curing agent include aliphatic amines, such as ethylene diamine, diethylene triamine, triethylene tetramine, hexamethylene diamine and m-xylylene diamine, aromatic amines, such as methaphenilene diamine, diaminodiphenyl methane, diaminodiethyl diphenyl methane and diaminodiethyl diphenyl sulfone, and third amines, such as benzyl dimethyl amine, tetramethyl guanidine and 2,4,6- tris-(dimethyl aminomethyl)phenol, as well as basic active hydrogen compounds, such as dicyandiamide, organic acid dihydrazids, such as adipic acid dihydrazid, and imidazoles, such as 2-methyl imidazole and 2-ethyl-4-methyl imidazole.

Examples of an anhydride-based curing agent include aliphatic anhydrides, such as polyadipic acid anhydride, poly (ethyl octadecanedioic acid) anhydride and polysebacic anhydride, alicyclic anhydrides, such as, methyl tetrahydrophthalic anhydride, hexahydro phthalic anhydride and methyl cyclohexene dicarboxylic anhydride, aromatic anhydrides, such as phthalic anhydride, trimellitic acid anhydride, pyromellitic anhydride and glycerol tris-trimellitate anhydride, and halogen-based anhydrides, such as HET acid anhydride and tetrabromophthalic anhydride.

Under the present invention, an amine-based curing agent, particularly a basic active hydrogen compound, may preferably be used as a curing agent for its relatively low curing temperature and good storage stability.

To enhance the curing activity of a thermosetting resin, a suitable curing accelerator may be used in combination with such a curing agent. Preferable concrete examples include combining a urea derivative or imidazole derivative as a curing accelerator with dicyandiamide or some other amine-based curing agent and combining a tertiary amine orimidazole derivative as a curing accelerator with a carboxylic anhydride or polyphenol compound as a curing agent.

Under the present invention, it is preferable to combine a urea-based curing accelerator comprising a urea derivative with an amine-based curing agent, particularly dicyandiamide, for its relatively low curing temperature and good storage stability. Of all urea-based curing accelerators, 3-phenyl-1,1dimethylurea, 3-(3,4-dichlorophenyl)-1,1-dimethylurea (DCMU), 1,1'-4(methyl-m-phenylene)bis(3,3'dimethylurea) and the like—particularly a compound containing two urea groups in its molecule, such as 1,1'-4(methyl-m-phenylene)bis(3,3'dimethylurea)—are preferably used.

Generally speaking, as curing activity increases, the stability of a resin composition at room temperature decreases. Under the present invention, it is preferable that 4 to 8 parts by mass of a curing agent and 0.5 to 5 parts by mass of a curing accelerator be added to 100 parts by mass of an epoxy resin as described above in view of both handleability at room temperature and curing performance during the molding process.

In addition to an epoxy resin or epoxy resins, curing agent and curing accelerator, such an epoxy resin composition may contain other components, such as a polymer compound, organic particles and inorganic particles, as appropriate according to the objective.

As such a polymer compound, a thermoplastic resin is preferably used. It is preferable to blend a thermoplastic resin as it has the expected effects of optimizing the viscosity of the resin composition and handleability of the prepreg and, in the case of a high-polarity one, improving bonding.

As such a thermoplastic resin, one containing a bond chosen from a carbon-carbon bond, amide bond, imide bond, ester bond, ether bond, carbonate bond, urethane bond, urea bond, thioether bond, sulfone bond, imidazole bond and carbonyl bond in its main chain is preferably used.

Of such thermoplastic resins, a subset of thermoplastic resins known as engineering plastics, including polyacrylate, polyamide, polyaramid, polyester, polycarbonate, polyphenylene sulfide, polybenz imidazole, polyimide, polyetherimide, polysulfone and polyethersulfone, are more preferably used, with polyimide, polyetherimide, polysulfone, polyethersulfone and the like even more preferably used for their excellent heat resistance.

It is preferable that to 1 to 20 parts by mass of such a thermoplastic resin be blended for 100 parts by mass of total epoxy resin in the epoxy resin composition as it is advantageous in terms of giving suitable viscoelasticity to the epoxy resin composition to make materials easier to handle during the molding process and enhancing the dynamic strength of the obtained carbon fiber-reinforced plastic.

As organic particles to be blended into such an epoxy resin composition, rubber particles and thermoplastic resin particles are preferably used. These particles are advantageous in terms of their effectiveness in improving the ductility of the resin and the impact resistance of carbon fiber-reinforced plastic parts. As thermoplastic resin particles, polyamide or polyimide particles are preferably used.

Furthermore, as such rubber particles, cross-linked rubber particles and core shell rubber particles, produced by graft-polymerizing a heterogeneous polymer over the surface of cross-linked rubber particles, are preferably used.

Examples of inorganic particles blended into such an epoxy resin composition include silica, alumina, smectite and synthesize mica. The main purpose of blending those inorganic particles into an epoxy resin composition is rheology control, i.e., thickening and provision of a thixotropic property.

Types of carbon fiber used for a carbon fiber prepreg include pitch-based and polyacrylonitrile-based, with polyacrylonitrile-based carbon fiber preferred for its relatively high tensile strength.

It is preferable that the tensile strength of a carbon fiber bundle be 3500 MPa or more, more preferably 4500 MPa or more. Selection of the tensile strength of a carbon fiber bundle in this range makes it possible to reduce the weight of the obtained carbon fiber composite material.

It is preferable that the elastic modulus of a carbon fiber bundle be 200 to 450 GPa, more preferably 225 to 400 GPa. Setting the elastic modulus to 200 GPa or more makes it possible to keep the thickness of the carbon fiber composite material (molding) low, while setting it to 450 GPa or less makes it possible to keep the composite characteristics of the molding, particularly its shear strength, high.

It is preferable that the fiber diameter of the carbon filament is in the range of 3 to 8 μm. To make it easier to draw numerous yarns together, it is more preferable that the fiber diameter of the carbon filament is in the range of 4 to 7.5 μm. From this viewpoint, it is even more preferable that the fiber diameter of the carbon filaments is in the range of 4.5 to 6.5 μm.

It is preferable that numerous filaments contained in a carbon fiber bundle be oriented to the same direction. Along these lines, carbon fiber bundles having low entanglement among the carbon filaments as produced through non-twisting oxidization and carbonization steps are used.

It is preferable that the degree of entanglement among the filaments in the carbon fiber bundle is 10 or less, more preferably 5 or less, and even more preferably 3 or less.

Setting the degree of entanglement to 10 or less makes it easier to evenly spread the numerous carbon filaments when producing a prepreg and restrict the occurrence of carbon filaments orientation fluctuation specks on a prepreg. The degree of entanglement is measured using the method described below.

<Measurement of Degree of Entanglement>

The degree of entanglement in a carbon fiber bundle is measured in accordance with the degree of entanglement measurement method under JIS L 1013: 2010 "Chemical Fiber to Filament Yarn Testing Methods". One end of a carbon fiber bundle measurement specimen is secured to the upper grip of dropping equipment with suitable performance, and a load (100 g) is attached to the measurement specimen at a point 1 m below the grip to let the specimen hang vertically. A hook (made of metal wire with a diameter of 1 mm) is inserted into the measurement specimen at a point 1 cm below in such a manner as to split the carbon fiber bundle into two. A load of a predetermined weight (10 g) is attached to the other end of the hook to let the hook slide down at a speed of about 2 cm/second. The distance L [mm] that the hook has traveled until it is stopped by an entanglement of constituent yarns of the fiber bundle is then measured.

The degree of entanglement is calculated from the measured travel distance of the hook L [mm] using the formula below. In this regard, if the hook travels to the lower end of the carbon fiber bundle, the result is recorded as L=1000. The measurement is repeated 50 times, and the average of the measured values is used for the calculation of the degree of entanglement.

Degree of Entanglement=1000/L

L: Travel distance of hook [mm]

It is preferable that the carbon fiber bundles to be used spread evenly during carbon fiber prepreg production process, while maintaining good yarn handleability during the carbon fiber manufacturing process, particularly the take-up step, and the carbon fiber prepreg production process. It is also preferable that the carbon fiber bundles to be used possess good compactness and spreadability. From this viewpoint, it is preferable that yarns that constitute carbon fiber bundles have a circular cross section and smooth surface.

It is preferable that when 25 of the filaments of a carbon fiber bundle that has been cut perpendicularly to its fiber axis are randomly selected and their cross sections are observed using an SEM and approximated as ellipses, the major axis/minor axis ratio is in the range of 1.00 to 1.10, more preferably in the range of 1.01 to 1.05, and even more preferably in the range of 1.02 to 1.04.

The surfaces of the carbon filaments have an arithmetic average roughness Ra, to be measured using the method described below, of 20 or less, more preferably 10 or less, and even more preferably 7 or less.

Ensuring that the major axis/minor axis ratio is preferably in the range of 1.00 to 1.10, more preferably 1.01 to 1.05, and even more preferably 1.02 to 1.04, and that surface roughness Ra is preferably 20 or less, more preferably 10 or less, even more preferably 7 or less, makes it possible to compactly arrange yarns constituting carbon fiber bundles within the carbon fiber bundles and prevent the misplacement of yarns, thanks to their smooth surfaces. This, in turn, allows carbon fiber bundles to spread evenly, while holding yarns together upon exertion of an external force thanks to the high compactness of carbon fiber bundles. As a result, it is possible to supply carbon fiber bundles containing uniformly oriented yarns to the matrix resin impregnation process as part of the production of a prepreg.

<Major Axis/Minor Axis Ratio of the Carbon Filaments>

The major axis and minor axis in the cross section of the filament in the carbon fiber bundle is determined by observing the cross section of the filament of the carbon fiber bundle using a scanning electron microscope and taking the longest of the observed elliptical major axes and the shortest of the observed elliptical minor axes as the major axis and the minor axis, respectively, with a ratio then taken of the major axis to the minor axis.

<Measurement of Carbon Fiber Surface Smoothness>

The degree of surface smoothness of carbon fiber is evaluated by the arithmetic average roughness (Ra) of the surface. The arithmetic average surface roughness is measured as follows: As a measurement specimen, carbon fiber yarns cut to a length of some several millimeters are used. They are then glued onto substrate (silicon wafer) using silver paste, with three-dimensional surface profile images taken of them at their mid points using an atomic force microscope (AFM).

The atomic force microscope used was a Dimension 3000 stage system from Digital Instruments, Inc. with a NanoScope IIIa controller. The observation conditions are as described below.

Scanning mode: Tapping mode

Probe: Probe-integrated silicon cantilever

Scanning range: 2.5 $\mu m^2$

Scanning speed: 0.3 Hz

Number of pixels: 512×512

Measuring environment: At room temperature, under atmospheric conditions.

With each image, the roundness of the surface of the specimen was approximated with a cubic plane, and the arithmetic average roughness (Ra) was calculated as the average of the five images taken of the five specimens.

Carbon fiber sometimes has surface deposits that diminish spreadability, examples including silicone oil oxidation product residues and carbides, such as soot, and it is preferable that they be removed. In concrete terms, if a silicone-based surface active agent is used during the spinning of the precursor fiber to obtain a high-strength carbon fiber, it is preferable that the amount of Si on the carbon fiber surface, as an indicator of foreign matter, be 0.01 or less in terms of an ESCA atomic ratio by anodically oxidizing the surface of the carbon fiber using a basic aqueous solution after carbonization, followed by surface cleaning with an acidic aqueous solution, or by providing a surface treatment after high temperature carbonization.

<Atomic Ratio Between Si and C (Si/C) on Fiber Surface>

Through measurement based on the measuring equipment and measurement conditions described below, the peak area ratio between the $Si_{2P}$ peak and the $C_{1S}$ peak observed near 100 eV is found, and the atomic ratio (Si/C) is determined by multiplying it by the instrumental constant of the equipment, 0.814.

Measuring Equipment:

ESCA750 manufactured by Shimadzu Corporation, excitation X-ray: Mg Kα1, 2 line, bond energy of C1S main peak: 284.6 eV.

Measurement for a carbon fiber deposited with a sizing agent or matrix resin is conducted after removing the sizing agent or matrix resin in accordance with the pre-treatment method described below.

Pre-Treatment Method:

After refluxing a 2:1 (weight ratio) mixed liquid of methanol and chloroform inside a Soxhlet extractor for 2 hours, the specimen is immersed in sulfuric acid at room temperature for 12 hours, followed by thorough washing with methanol and blow-drying.

It is preferable that a carbon fiber bundle have no more than three fiber separation/100 m as measured using the method described below. Keeping the number of fiber separations to this range makes it possible to perform fiber spreading without resorting to a risky fiber spreading procedure during the carbon fiber bundle spreading process and the carbon fiber bundle spreading step as part of the prepregging process aimed at impregnating carbon fiber bundles with a matrix resin and thereby obtain evenly spread carbon fiber bundles. This, in turn, makes it possible to manufacture carbon fiber prepregs having good carbon filament straightness.

<Number of Fiber Separations in Fiber Bundle>

Figure 1:
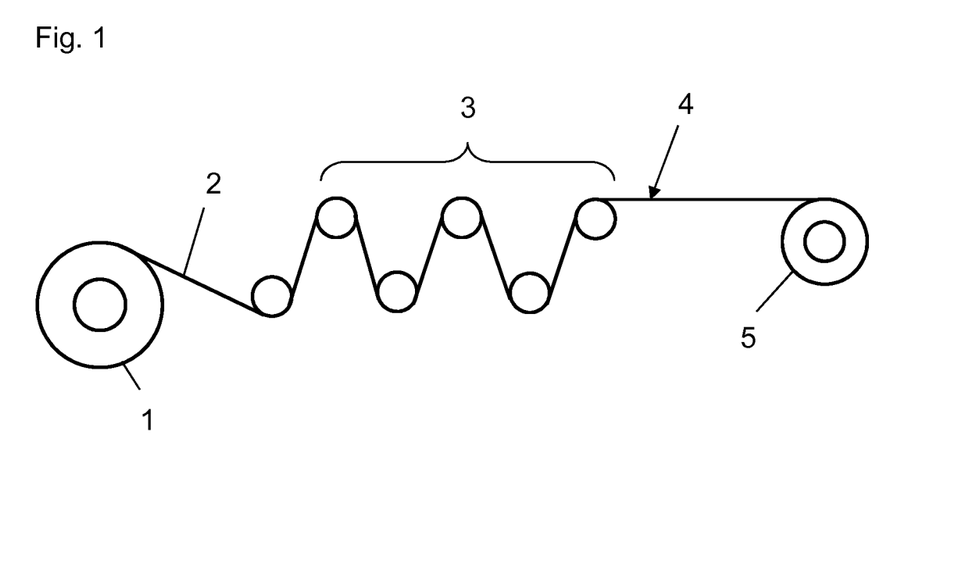
FIG. 1 is a schematic side view of measuring equipment for the number of fiber separations found in a carbon fiber bundle.

As illustrated in FIG. 1, the fiber bundle to be measured 2 is set on a tension-adjustable creeling unit 1 and rolled out from the creeling unit 1. After being passed through multiple rolls arranged in a zigzag configuration via multiple fixed guide bars 3 to be widened to a total fineness of 1100 dtex per mm of width under a tension of 0.45 cN/tex, the fiber bundle 2 is taken up on a winder 5 at a speed of 5 m/min. In this manner, the fiber bundle 2 is continuously run for about 100 m, and any gap 1 mm or more in width found among fibers at the end-of-widening point 4, located downstream of the fixed guide bars 3, by visual inspection is defined as a "fiber break", with the number of such breaks (number of occurrences) counted.

It is preferable that the carbon fiber used for the present invention be manufactured by first deciding on the wet spinning conditions of a polyacrylonitrile precursor, such as the type of solvent for the dope, degree of polymerization of the polymer, copolymerization composition and concentration, and then producing a precursor with a smooth surface and circular cross section through a control of the pinning conditions, followed by the calcination of the produced precursor.

Such a precursor may be produced setting production conditions geared towards a relatively low coagulation speed via the adjustment of the temperature and concentration of the coagulation bath and concentration of the polymer dope—in the case of adopting wet spinning, for instance, keeping the ratio between the coagulated yarn take-over speed and orifice discharge line speed, e.g. the so-called daft, low. If dry-wet spinning is adopted, setting the draft higher than the case with wet spinning, as well as adopting coagulation bath temperature and concentration conditions conducive to obtaining uniformly coagulated yarns, makes it possible to produce a precursor with a smooth surface and near circular cross section.

When producing a precursor, it is preferable that a silicone oil solution, more preferably an oil solution containing an amino-modified silicone dispersed or dissolved in water as a component, be used as a surface active agent, if one is to be added to the precursor, from the viewpoint of preventing a deterioration in the product quality of fiber bundles due to a fusing of yarns during the calcination process and an inadequate compactness of fiber bundles and keeping the physical properties of the obtained carbon fiber high.

A carbon fiber bundle is produced by first flameproofing a precursor obtained in the above manner under tension in a heated atmosphere measuring 200 to 300° C. without introducing a twist, next calcinating it at a temperature of up to 2000° C. in an inert gas atmosphere, if necessary followed up with graphitization at a temperature of up to 3000° C. in an inert gas atmosphere, and then providing it with a surface treatment and sizing treatment, followed by drying and taking up on a drum or bobbin.

The preferable tension is 2 to 8 cN/tex of carbonized yarn in the carbonization process, 4 to 8 cN/tex of graphitized yarn in the graphitization process, and 2 to 8 cN/tex of final yarn in the post-treatment process. Once a decision is made on the treatment equipment and treatment temperature, these tensions can be adjusted by controlling the fiber bundle speed ratio between the fiber bundle inlet and the fiber bundle outlet (inlet speed/outlet speed) in each of the flameproof process, carbonization process, graphitization process, and post-treatment process.

Examples of a sizing agent added after the surface treatment include a binder containing an epoxy group or urethane group and other surface active agents. The amount of sizing agent to be added relative to the carbon fiber is preferably 0.1 to 2 mass %, more preferably 0.5 to 1.2 mass %. After a sizing agent is added, a carbon fiber bundle can be obtained by drying it under tension as necessary and taking it up on a drum or bobbin.

To ensure the compactness of a fiber bundle and prevent the misplacement of yarns, it is preferable that the amount of sizing agent deposited and drying conditions of the fiber bundle to which the sizing treatment has been transferred be adjusted so that the drape value of the carbon fiber bundle after the sizing agent is added is 5 cm to 18 cm, more preferably 8 cm to 15 cm.

Setting the drape value of a carbon fiber bundle to 5 cm or more makes it possible to ensure the compactness of the carbon fiber bundle traveling along the fiber path, particularly the compactness of the carbon filaments contained in the carbon fiber bundle, as well as preventing carbon fiber yarn drawing specks. It also makes it possible to prevent fluffing along such a portion of the fiber path as to fall between the creeling unit in which a carbon fiber bundle is held during prepregging, namely when a prepreg is produced by impregnating carbon fiber bundles with a matrix resin, to the resin impregnation facility. Furthermore, keeping the drape value at 18 cm or less makes it possible to ensure good fiber spreadability among the carbon filaments.

<Measurement of Drape Value>

Figure 2:
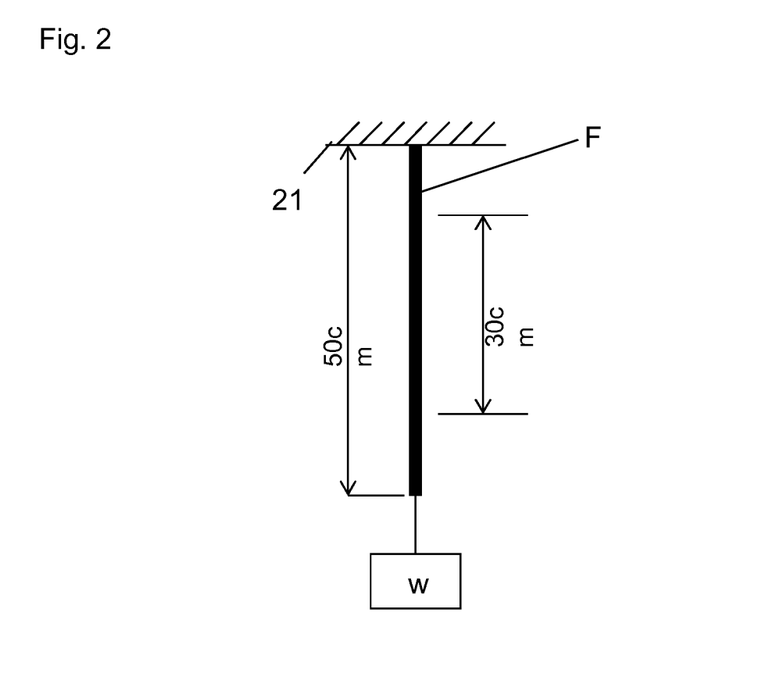
FIG. 2 is a schematic side view of fiber bundle pre-treatment equipment to measure the drape value of a fiber bundle.
Figure 3:
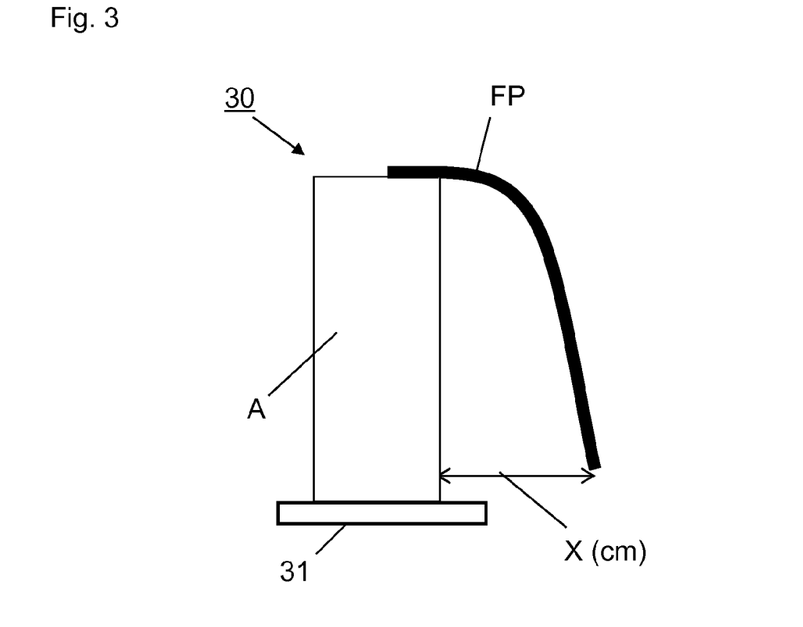
FIG. 3 is a schematic side view of measuring equipment for the drape value of a fiber bundle.

The drape value of a carbon fiber bundle is measured using the method illustrated in FIGS. 2 and 3.

As illustrated in FIG. 2, the top end of a carbon fiber bundle F, which has been cut to a length of about 50 cm, is secured to a specimen anchoring jig 21, and a weight W is attached to the bottom end of the carbon fiber bundle F to let the carbon fiber bundle F hang vertically. Keeping this setup, the carbon fiber bundle F is left to stand for 30 minutes or more under atmospheric conditions comprising a temperature of 23° C. and a humidity of 60% and under a tension of 0.0375 g/tex as exerted by the weight W to prepare a measurement specimen. The top and bottom ends of the prepared measurement specimen is then removed to leave a middle portion measuring about 30 cm long as illustrated in FIG. 2 for use as measurement piece FP.

FIG. 3 illustrates the drape value measuring equipment. The drape value measuring equipment 30 comprises a base 31 with a horizontal top face, a quadrangular prism A sitting securely on the top face of the base 31, and a separately furnished flat plate B (not shown in the drawing).

One end of the measurement piece FP is held down on the top face of the quadrangular prism A in such a manner that part of the measurement piece FP lies flat on the top face of the quadrangular prism A and the rest of the measurement piece FP, adjusted to 25 cm in length, sticks out into the air, parallel to the floor surface and perpendicular to the adjacent side of the quadrangular prism A, with the other end of the measurement piece FP supported by the flat plate B. Now, the flat plate B is suddenly removed, leaving the measurement piece FP in a cantilever state. One second later, the shortest distance X (cm) that the far end of the measurement piece FP, which has sagged down due to gravity, makes with the side of the quadrangular prism A is measured, with this distance X (cm) defined as the drape value.

When the traveling route of the fiber bundle (fiber path) in the precursor fiber production process and the carbon fiber production process features fiber guides to avoid the occurrence of false twisting, a random twisting force, entanglement, etc. to yarns, it is preferable that fiber guides with low compacting action on yarns with regard to the width of the fiber bundle and low friction against the yarns be used. When changing the traveling direction of the fiber bundle using fiber guides, it is preferable that no force with a direction other than the direction of fiber orientation (fiber axis direction) be applied to the fiber bundle at the time of direction change.

When combining two or more fiber bundles to form a final fiber bundle, a fiber bundle having no more than three fiber breaks/100 m with a degree of yarn entanglement of 10 or less, preferably 5 or less, and even more preferably 3 or less, may be obtained by adopting a fiber path designed to prevent the occurrence of twisting or a random twisting force to the fiber bundle and avoid entanglement between component fiber bundles and between yarns. Although it is permitted to intentionally introduce fiber spreading and entanglement through air treatment to improve the compactness of the fiber bundle and prevent inter-yarn adhesion, it is preferable that it be performed while ensuring that the number of fiber breaks and the degree of entanglement stay within the ranges specified above.

To obtain a prepreg with good external appearance, it is necessary to widen carbon fibers uniformly, and, to achieve uniform widening, it is preferable that the number of yarns within a carbon fiber bundle be 15000 or less. From this viewpoint, the smaller the number of yarns, the better, but, if the number of yarns becomes too small, there arises a need to use a greater number of carbon fiber bundles than otherwise is the case to obtain a desirable prepreg. This will increase the industrial difficulty in manufacturing carbon fiber bundles as fibers need to be drawn by applying a uniform tension. In practice, therefore, it is preferable that the number of fiber yarns in a fiber bundles be 500 or more, more preferably 1000 to 7000.

From the viewpoint of producing a prepreg in which carbon fibers have spread uniformly, it is preferable that the original width of the carbon fiber bundle used to assemble the prepreg be smaller than the width per carbon fiber bundle of the prepreg, namely the target width. For this reason, it is preferable that carbon fiber packages in which a carbon fiber bundle with such an original width has been rolled up be used. Avoiding the use of a fiber bundle with too small an original width makes it possible to prepare a prepreg without generating specks during fiber spreading.

It is preferable that the original width be 95% or less of the target width, more preferably 90% or less. It is also preferable that the original width be 25% or more of the target width, more preferable 30% or more.

Setting the original width of the carbon fiber bundle to less than 90% of the target width makes it possible to maintain the straightness of yarns and minimize interference between yarns belonging to adjacent carbon fiber bundles even if its width increases during prepregging, as well as producing a prepreg having a uniform thickness and evenly spread fiber bundles.

The original width of the carbon fiber bundle considered desirable can be obtained by adjusting, as appropriate, the fineness of the carbon fiber bundle, the number of yarns (filaments) that make up the carbon fiber bundle, process conditions of the surface treatment and subsequent steps in the carbon fiber bundle manufacturing process, particularly conditions for taking up the carbon fiber bundle on a bobbin or drum.

<Original Width of Carbon Fiber Bundle>

The original width of the carbon fiber bundle defined as the average of the width values recorded by carbon fiber bundles from all bobbins immediately before the carbon fiber bundle leaves the package, with the measurement performed in 0.1 mm steps using a ruler.

It suffices as long as the prepreg production equipment is capable of applying a tension to fibers to draw them in a single direction and has a function to widen the carbon fiber bundle prior to resin impregnation. In the case of equipment designed to widen the carbon fiber bundle by blowing compressed air, however, it is preferable that a means of widening based on rolls, etc. be used in view of the possibility that entanglement may occur between yarns within the carbon fiber bundle.

It is preferable that the width of a carbon fiber sheet composed of two or more carbon fiber bundles prior to resin impregnation be determined in such a way that the Width of the carbon fiber bundle prior to resin impregnation/Width per carbon fiber bundle of the prepreg (target width) ratio, in other words the ratio of the sum of the widths of all fiber bundles to the desired width of the prepreg sheet (hereinafter referred to as the "widening ratio"), becomes 80 to 98%, preferably 85 to 95%, as a result of application to each carbon fiber bundle of a tension of 0.3 to 6 cN/tex, preferably 0.5 to 6 cN/tex, and more preferably 1.5 to 3 cN/tex.

Setting the widening ratio of the carbon fiber sheet to 98% or less makes it possible to prevent the overlapping of carbon fibers during the process of obtaining the target width using the resin impregnation pressure and limit the reduction in the spreadability of the carbon filaments. It is more preferable that the widening ratio of the carbon fiber sheet be 95% or less. Setting the widening ratio of the carbon fiber sheet to 80% or more makes it possible to obtain the target width while preventing excessive widening by taking advantage of the resin impregnation pressure. From this viewpoint, it is even more preferable that the widening ratio of the carbon fiber sheet be 85% or more.

Setting the tension applied to a fiber bundle to 0.3 cN/tex or more makes it possible to prevent the phenomenon in which carbon fiber bundles are displaced significantly by the resin being forced into the carbon fiber sheet during resin impregnation. Furthermore, setting the tension to 0.5 cN/tex or more makes it possible to prevent the movement in thickness direction of yarns within carbon fiber bundles during resin impregnation and restrict the reduction in the straightness of the carbon filaments. From this viewpoint, it is even more preferable that the tension be 1.5 cN/tex or more. Setting the tension to 6 cN/tex or less makes it possible to prevent fluffing while spreading carbon fiber bundles. From this viewpoint, it is ideal that the tension be 3 cN/tex or less.

In cases where carbon fiber bundles are widened while the above tension is applied, a prepreg with degraded appearance quality sometimes results because of the presence of ruffled yarns on the surface of the prepreg due to fluffing resulting from the wearing and tearing of yarns. For this reason, it is preferable to gradually widen the carbon fiber bundles in multiple stages using two or more pairs of spreader rolls. It is also preferable that the widening rate per roll stage of a carbon fiber bundle, defined as (Width after passage through rolls−Width before passage through rolls)/Width before passage through rolls (%), be on average 10% or less. Widening carbon fiber bundles in multiple stages on average at a widening rate per spreader roll stage of 10% or less makes it possible to uniformly spread the carbon filaments. From this viewpoint, it is more preferable that the widening rate per roll stage of a carbon fiber bundle be on average 7% or less.

<Width of Carbon Fiber Bundle Prior to Resin Impregnation>

The width of a carbon fiber bundle prior to resin impregnation is defined as the average of the width values recorded by all carbon fiber bundles traveling along the pass line on the pass line before resin impregnation, with the measurement performed in 0.1 mm steps using a ruler.

Figure 4:
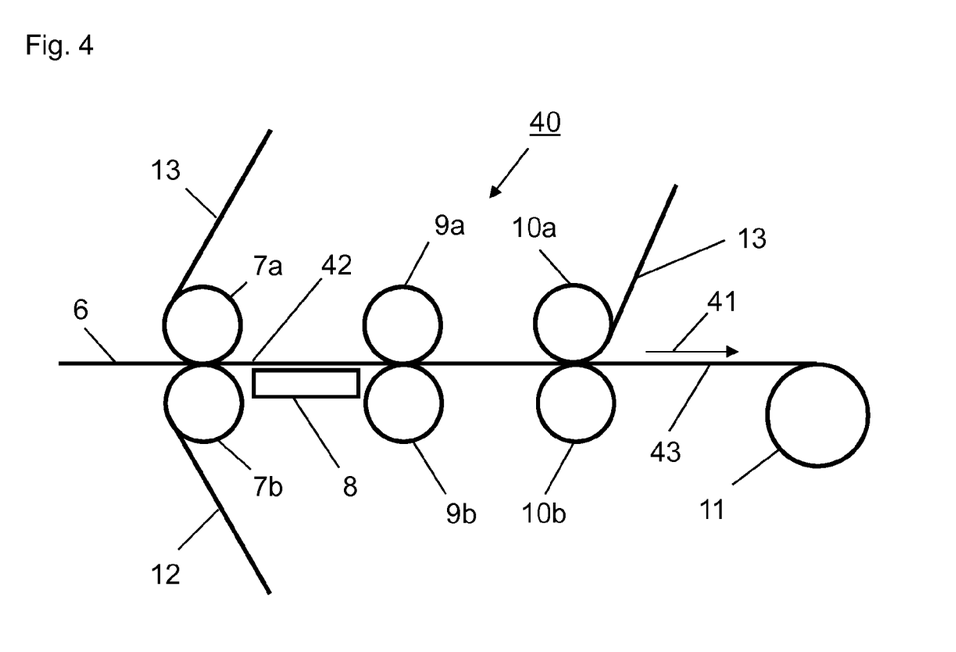
FIG. 4 is a schematic side view of prepregging equipment.

An example of a process designed to impregnate a carbon fiber sheet comprising two or more carbon fiber bundles as prepared in a manner described above, namely the prepregging process, is described using FIG. 4.

FIG. 4 is a schematic side view of example prepregging equipment in the prepregging process. In FIG. 4, prepregging equipment 40 features, along the pass line 41 from the side on which the carbon fiber sheet 6 is introduced, a pair of lead-in rolls 7a, 7b, heater 8, a pair of impregnating rolls 9a, 9b, a pair of draw-off rolls 10a, 10b, and a take-up device 11.

The carbon fiber sheet 6, which has been spread to 80 to 98% of the target width, is supplied to the pair of lead-in rolls 7a, 7b and, as it travels along, becomes sandwiched between a release sheet (release paper) 13, supplied along the upper lead-in roll 7a, and a prepregging resin sheet (a resin sheet constituting the matrix resin) 12, supplied along the lower lead-in roll 7b. The laminated sheet comprising three layers 42 passes through a heater 8, during which time the resin contained in the prepregging resin sheet 12 is fluidized, and then the carbon fiber sheet 6 is impregnated with the fluidized resin (matrix resin) between the pair of impregnating roll 9a, 9b.

After being impregnated with the resin, the carbon fiber sheet 6 is taken up as it passes through the pair of draw-off rolls 10a, 10b. The release sheet 13, passing through the pair of draw-off rolls 10a, 10b towards take-up device 11 as part of sheet 42, is removed along the upper draw-off roll 10a. Subsequently, the carbon fiber sheet impregnated with the matrix resin (prepreg) 43 is taken up by the take-up device 11 in roll form.

A roll of a unidirectional prepreg containing numerous carbon filaments and orientated in one direction has now been produced. In this regard, the release sheet 13 supplied along the upper lead-in roll 7a may be replaced with a prepregging resin sheet similar to the prepregging resin sheet 12.

After the heater 8 heats the resin constituting the resin sheet 12 to 80 to 150° C., the pair of impregnating rolls 9a, 9b pressurizes the sheet 42 to 40 to 150 N/cm to impregnate the carbon fiber sheet with the resin. During this process, heated resin penetrates through the carbon fibers constituting the carbon fiber sheet, while, at the same time, the fibers are widened to the predetermined width by the action of the impregnating rolls, followed by cooling. In this manner, a prepreg with a uniform thickness and a uniform yarn orientation is produced.

The obtained prepreg is then molded, through sheet winding, into cylinders for use fishing rods, golf shafts, and other products. After being provided with surface binding with wrapping tape, etc., it is heated in a heating furnace to cure the matrix resin, and this turns it into a carbon fiber composite material (molding).

Alternatively, two or more of the obtained prepregs are laminated with predetermined fiber orientation angles. After being place in a vacuum bag, they are heated in an autoclave or heating furnace to cure the matrix resin, while the removal of voids takes place at the same time. This turns the prepregs into a carbon fiber composite material (molding).

Alternatively, the obtained prepreg is placed in a mold and press molded into a carbon fiber composite material (molding), e.g. a panel for use in an equipment chassis, etc.

The carbon fiber composite material produced in this manner exhibits excellent uniformity in external appearance.

EXAMPLES

Example 1

A dimethyl sulfoxide solution containing 20 mass % of an acrylonitrile-based polymer with an intrinsic viscosity [η] of 1.80 that comprises 99.5 mol % of acrylonitrile and 0.5 mol % of itaconic acid was prepared for use as a spinning dope. This spinning dope was first discharge into the air through 6000 0.15-mm spinning holes featured on a spinning orifice, and then was introduced into a coagulation bath comprising a 35% aqueous solution of dimethyl sulfoxide that had been temperature controlled to 10° C. to obtain coagulated fibers. The obtained coagulated fibers were rinsed and then drawn. Next, after being added with a surface active agent containing an amino-modified silicone dispersoid, it was densified through drying. The densified coagulated fibers were further drawn using a drawing apparatus to obtain a precursor fiber bundle comprising 6000 yarns with a circular cross section and smooth surface, with the obtained precursor fiber bundle taken up on a bobbin.

During this process, to prevent the occurrence of a random twisting force and associated false twisting to the fiber along the fiber path stretching from the orifice to the take-up stage, the fiber (precursor fiber bundle) was passed through a system of rolls and guides before being taken up on a bobbin. The degree of fiber entanglement of the obtained precursor fiber was 1.5.

This precursor fiber was wound off the bobbin while taking care not to introduce any twisting, and was forwarded to the carbonization process, where it was provided with a flameproof treatment while remaining in an untwisted state, followed by a carbonization treatment at a temperature of up to 1900° C. and a tension of 5 g/carbonized yarn-tex. The obtained carbon fiber bundle was subjected to continuous anodic oxidation under the same tension to add affinity for the matrix resin. The anodically oxidized carbon fiber bundle was sized, dried and taken up on a bobbin. The obtained carbon fiber bundle contained 6000 filaments having a fineness of 250 tex, and had a strand strength of 5490 MPa and an elastic modulus of 295 GPa as measured in accordance with JIS R 7608: 2007. Its width on the bobbin was 3.5 mm.

The carbon filaments contained in this carbon fiber bundle had a major axis/minor axis ratio of 1.03 and a degree of surface smoothness, Ra, of 2.5. The carbon fiber bundle had a degree of fiber entanglement of 2.7, an ESCA Si/C atomic ratio of 0.00 (less than 0.001) and a drape value of 15.0 cm, with two fiber breaks per 100 m. The orientation of the carbon filaments that constituted the carbon fiber bundle was uniform.

Twenty parts by mass of a bisphenol A-type epoxy resin (jER1005F, supplied by Mitsubishi Chemical Corporation) and 80 parts by mass of another bisphenol A-type epoxy resin (jER828, supplied by Mitsubishi Chemical Corporation) were melt-kneaded, and, at 40 to 60° C., 5 parts by mass of dicyandiamide (DICY-7, supplied by Mitsubishi Chemical Corporation) and 4.2 parts by mass of dicyandiamide (Omicure 24, supplied by CVC Specialty Chemicals, Inc.) were added, followed by kneading, to obtain a resin composition.

This resin composition was applied to a support sheet as a coat to obtain a prepregging resin sheet for use as a matrix resin during prepregging.

Two or more of carbon fiber bundles obtained above were drawn together under a tension of 1.9 cN/tex, and were pass through multi-stage widening equipment comprising two or more pairs of rolls to obtain a carbon fiber sheet. Using the obtained carbon fiber sheet and prepregging resin sheet, a carbon fiber prepreg sheet was obtained under conditions specified in Table 1.

Out of the obtained carbon fiber prepreg sheet, a sample prepreg was cut and left to stand for two weeks at 50° C. and 30 minutes each at 80° C., 110° C., 130° C. and 180° C. in that order all under normal pressure to harden the matrix resin without letting it flow. Out of the prepreg with a hardened resin, 10 mm×10 mm square samples were cut with the orientation of the fibers (fiber axis) designated as their first axis. A total of 20 samples were taken uniformly across the whole width of the prepreg. Each sample was then cut perpendicularly to its first axis (fiber axis) to obtain 20 measurement specimens. Each of the obtained measurement specimens was embedded in a resin to fix its position in such a manner as to keep the cut surface visible, and the embedding resin was cured. The surface of the cured resin through which the cut surface of the embedded measurement specimen was visible was polished with #800 sandpaper to prepare a measurement piece.

The polished surface of the prepared measurement piece (i.e. the cut surface of the prepreg) was photographed using a VHX-500 microscope from Keyence Corporation. Photographing conditions were as follows: lens: VH-Z100R, field of view: 1.02×0.76 mm, magnification: 300 times, resolution: 1600×1200 pixels, and number of measurements: one per measurement piece, taken by photographing whichever cut surface was arbitrarily chosen.

On each of the obtained 20 photographs, the number of the carbon filaments contained in the unit area (width of 100 μm×depth of 30 μm from the surface) was counted, and the CV value was calculated for the 20 measurement pieces. The obtained CV value is shown in Table 1.

Again, out of the obtained carbon fiber prepreg sheet, 200 mm×200 mm square samples were cut with the orientation of the fibers (fiber axis) designated as their first axis. A total of five samples were taken uniformly across the whole width of the prepreg for use as measurement pieces for the measurement of the fiber orientation angle and fluctuation therein. One of the measurement pieces was immersed in water to remove the surface air.

Each of the prepared measurement pieces was photographed using a VHX-500 microscope from Keyence Corporation by placing it in such a manner that the average orientation of its yarns coincided with the 0° direction.

Photographing conditions were as follows: lens: VH-Z20R, field of view: 3.04×2.28 mm, magnification: 100 times, resolution: 1600×1200 pixels, and number of measurements: five per measurement piece, taken by photographing areas around five randomly selected points on whichever cut surface was arbitrarily chosen.

Using the image processing library HALCON (Ver.8.0) from MVTec, the obtained photographs were subjected to an image analysis in the following procedure to emphasize each individual carbon fiber yarn: noise removal, contour enhancement, binarization, enlargement/contraction and thinning. The software then calculated the average fiber orientation direction (0°) of the carbon filaments and, by calculation, identified the carbon filaments that deviated from the calculated average fiber orientation direction (0°) by a certain angle (±3°) or more in absolute value thereof and had at least a certain length (150 pixels, equivalent to 0.285 mm), followed by a calculation of the fluctuation in the orientation of the carbon filaments using formula (1) shown earlier. The average of all 25 measurements obtained was taken as the fluctuation in the fiber orientation angle of the carbon filaments. The percentage projected area share of fibers having the angle of 3° or more in absolute value thereof is shown in Table 1.

Examples 2 to 9 and Comparative Examples 1 to 11

Using the same spinning dope as Example 1, various carbon fibers were produced by adjusting the number of spinning holes on the orifice, spinning method, and spinning/calcination conditions. Their values of the major axis/minor axis ratio with regard to the cross sections of filaments after calcination and the surface roughness are shown in Tables 1 to and 4 to 7.

In addition, carbon fibers with characteristics as shown in Tables 1 to 3 and Tables 4 to 7 were obtained by adjusting yarn-making conditions, such as the type of silicone oil solution and drawing conditions, calcinations conditions, particularly the calcination temperature and tension, and take-up conditions.

Those carbon fibers were prepregged under various conditions shown in Tables 1 to 3 and Tables 4 to 7. The results are also shown in Tables 1 to 3 and Tables 4 to 7.

When the CV value of the carbon filaments was 10% or less, carbon fiber prepregs having good appearance characteristics could be obtained by eliminating the surface fluctuation in color shade. When the projected area of the carbon filaments having a fiber orientation angle of ±3° or more in absolute value thereof was also 2% or less, carbon fiber prepregs having even better appearance characteristics could be obtained by eliminating abnormal localized surface reflections. Those prepregs all looked uniform. Carbon fiber bundles whose CV value of the carbon filaments exceeded 10% and whose projected area of the carbon filaments having a fiber orientation angle of ±3° or more in absolute value thereof exceeded 2% produced carbon fiber prepregs having poor external appearance.

The evaluation of external appearance was performed by five testers in terms of the uniformity of prepreg surface color shade distribution and light reflection (presence or absence of specks). Evaluation results were graded in three levels according to the number of testers who gave a positive assessment for each item: Excellent (all five), good (four), and unsatisfactory (no more than three).

By placing the prepreg on a horizontal desktop, color shades were evaluated according to the presence or absence of color shade fluctuation specks based on a visual observation from the z-axis direction (perpendicular to the prepreg surface), while light reflection was evaluated according to the presence or absence of reflection specks based on a visual observation with changing viewing angles from the z-axis direction to the y-axis direction (carbon fiber axis direction).

By molding such a carbon fiber prepreg, a carbon fiber-reinforced composite material was produced. In more concrete terms, two or more carbon fiber prepregs were laminated to produce a 1 mm-thick molding, and the laminate was placed in a metal mold to compression-mold it. The metal mold had a shape suitable for molding a flat surface, while molding conditions comprised a metal mold temperature of 150° C., molding pressure of 2 MPa, and time to demolding of 5 minutes.

Evaluation results for the external appearance of carbon fiber-reinforced composite materials (moldings) are shown in Tables 1 to 3 in the case of Examples and Tables 4 to 7 in the case of Comparative examples. As can be seen from these tables, when carbon fiber prepregs whose CV value of the carbon filaments was 10% or less were used (Examples 1 to 9), carbon fiber reinforced composite materials having good appearance characteristics were obtained.

When there was no fluctuation in surface color shade and the projected area of fibers having angle of ±3° or more in absolute value thereof was 2% or less, carbon fiber prepregs having good appearance characteristics were obtained. They then provided uniform-looking moldings without localized reflection abnormality.

In particular, when prepregs whose CV value of the carbon filaments was 8% or less and whose projected area of the carbon filaments having a fiber orientation angle ±3° or more in absolute value thereof was 0.8% or less were used (Examples 1 and 2), appearance characteristics were excellent.

Carbon fiber prepregs whose CV value of the carbon filaments exceeded 10% and whose projected area of fibers having angle of ±3° or more in absolute value thereof exceeded 2% (Comparative example 2 to 11) provided carbon fiber reinforced composite materials having poor external appearance. With Comparative example 1, in which the width of the prior to impregnation/target width per carbon fiber bundle ratio (%) was set low, a carbon fiber prepreg could not be prepared.

TABLE 1

| | Item | Unit | Example 1 | Example 2 | Example 3 |
|---|---|---|---|---|---|
| Carbon fiber | Tensile strength | MPa | 5490 | 4500 | 5490 |
| | Elastic modulus | GPa | 295 | 375 | 295 |
| | Diameter | μm | 5.5 | 5.5 | 5.5 |
| | Weight per unit length | tex | 250 | 190 | 250 |
| | Si/c | — | 0.00 | 0.00 | 0.00 |
| | Width | mm | 3.5 | 3.0 | 3.5 |
| | Ra | — | 2.5 | 2.0 | 2.5 |
| | Major axis/minor axis ratio | — | 1.03 | 1.04 | 1.03 |
| | Drape value | cm | 15.0 | 9.6 | 15.0 |
| Prepreg | Unit area weight of carbon fibers | g/m$^2$ | 55 | 40 | 55 |
| | Resin content | wt % | 35 | 40 | 35 |
| | Tension on carbon fiber bundle | cN/tex | 1.9 | 2.4 | 0.9 |
| | Number of spreader roll stages | — | 6 | 6 | 6 |
| | Widening rate per spreader roll stage | % | 2.2 | 6.6 | 2.2 |
| | Width of carbon fiber bundle prior to spreading | mm | 4.0 | 4.4 | 4.0 |
| | Width of carbon fiber bundle after prepregging | mm | 4.5 | 4.8 | 4.5 |
| | Widening ratio | % | 88.9 | 91.7 | 88.9 |
| | CV value of cross-sectional numerical density of carbon filaments | % | 5.4 | 7.4 | 5.9 |
| | Percentage of filaments having angle of ±3° or more in absolute value thereof | % | 0.72 | 0.39 | 1.15 |
| | Appearance (visual observation) Fluctuation in color shade | — | Excellent | Excellent | Excellent |
| | Fluctuation in orientation of carbon filaments | — | Excellent | Excellent | Good |
| Molding | Appearance (visual observation) | — | Excellent | Excellent | Good |

TABLE 2

| | Item | Unit | Example 4 | Example 5 | Example 6 |
|---|---|---|---|---|---|
| Carbon fiber | Tensile strength | MPa | 4900 | 4900 | 5490 |
| | Elastic modulus | GPa | 233 | 233 | 295 |
| | Diameter | μm | 6.9 | 6.9 | 5.5 |
| | Weight per unit length | tex | 200 | 402 | 250 |
| | Si/c | — | 0.03 | 0.04 | 0.00 |
| | Width | mm | 2.0 | 4.8 | 3.5 |
| | Ra | — | 3.0 | 5.0 | 2.5 |
| | Major axis/minor axis ratio | — | 1.02 | 1.03 | 1.03 |
| | Drape value | cm | 7.3 | 13.8 | 15.0 |
| Prepreg | Unit area weight of carbon fibers | g/m$^2$ | 40 | 75 | 55 |
| | Resin content | wt % | 40 | 50 | 40 |
| | Tension on carbon fiber bundle | cN/tex | 1.6 | 0.9 | 4.5 |
| | Number of spreader roll stages | — | 9 | 6 | 6 |
| | Widening rate per spreader roll stage | % | 8.9 | 1.4 | 3.1 |
| | Width of carbon fiber bundle prior to spreading | mm | 4.3 | 5.0 | 4.2 |
| | Width of carbon fiber bundle after prepregging | mm | 5.0 | 5.4 | 4.5 |
| | Widening ratio | % | 86.0 | 92.6 | 93.3 |
| | CV value of cross-sectional numerical density of carbon filaments | % | 8.6 | 8.5 | 6.2 |
| | Percentage of filaments having angle of ±3° or more in absolute value thereof | % | 1.10 | 1.30 | 1.58 |
| | Appearance (visual observation) Fluctuation in color shade | — | Good | Good | Excellent |
| | Fluctuation in orientation of carbon filaments | — | Good | Good | Good |
| Molding | Appearance (visual observation) | — | Good | Good | Good |

TABLE 3

| | Item | Unit | Example 7 | Example 8 | Example 9 |
|---|---|---|---|---|---|
| Carbon fiber | Tensile strength | MPa | 5490 | 5490 | 5490 |
| | Elastic modulus | GPa | 295 | 295 | 295 |
| | Diameter | μm | 5.5 | 5.5 | 5.5 |
| | Weight per unit length | tex | 250 | 250 | 250 |
| | Si/c | — | 0.00 | 0.00 | 0.00 |
| | Width | mm | 3.5 | 3.5 | 3.5 |
| | Ra | — | 2.5 | 2.5 | 2.5 |
| | Major axis/minor axis ratio | — | 1.03 | 1.03 | 1.03 |
| | Drape value | cm | 15.0 | 15.0 | 15.0 |
| Prepreg | Unit area weight of carbon fibers | g/m$^2$ | 50 | 40 | 55 |
| | Resin content | wt % | 35 | 40 | 35 |
| | Tension on carbon fiber bundle | cN/tex | 1.8 | 4.2 | 0.4 |
| | Number of spreader roll stages | — | 3 | 6 | 6 |
| | Widening rate per spreader roll stage | % | 9.4 | 6.8 | 3.6 |
| | Width of carbon fiber bundle prior to spreading | mm | 4.6 | 5.2 | 4.3 |
| | Width of carbon fiber bundle after prepregging | mm | 5.0 | 6.3 | 4.5 |
| | Widening ratio | % | 91.7 | 82.4 | 96.2 |
| | CV value of cross-sectional numerical density of carbon filaments | % | 9.4 | 9.2 | 8.4 |
| | Percentage of filaments having angle of ±3° or more in absolute value thereof | % | 1.73 | 1.45 | 2.23 |
| | Appearance (visual observation) Fluctuation in color shade | — | Good | Good | Good |
| | Appearance (visual observation) Fluctuation in orientation of carbon filaments | — | Good | Good | Unsatisfactory |
| Molding | Appearance (visual observation) | — | Good | Good | Good |

TABLE 4

| | Item | Unit | Comparative example 1 | Comparative example 2 | Comparative example 3 |
|---|---|---|---|---|---|
| Carbon fiber | Tensile strength | MPa | 5490 | 5490 | 5490 |
| | Elastic modulus | GPa | 295 | 295 | 295 |
| | Diameter | μm | 5.5 | 5.5 | 5.5 |
| | Weight per unit length | tex | 250 | 250 | 250 |
| | Si/c | — | 0.00 | 0.00 | 0.00 |
| | Width | mm | 3.5 | 3.5 | 3.5 |
| | Ra | — | 2.5 | 2.5 | 2.5 |
| | Major axis/minor axis ratio | — | 1.03 | 1.03 | 1.03 |
| | Drape value | cm | 15.0 | 15.0 | 15.0 |
| Prepreg | Unit area weight of carbon fibers | g/m$^2$ | 20 | 50 | 55 |
| | Resin content | wt % | 40 | 35 | 70 |
| | Tension on carbon fiber bundle | cN/tex | 1.2 | 1.8 | 0.9 |
| | Number of spreader roll stages | — | 6 | 3 | 6 |
| | Widening rate per spreader roll stage | % | 13.0 | 11.5 | 2.7 |
| | Width of carbon fiber bundle prior to spreading | mm | 7.3 | 4.9 | 4.1 |
| | Width of carbon fiber bundle after prepregging | mm | 12.5 | 5.0 | 4.5 |
| | Widening ratio | % | 58.4 | 97.0 | 91.1 |
| | CV value of cross-sectional numerical density of carbon filaments | % | — | 12.4 | 15.4 |
| | Percentage of filaments having angle of ±3° or more in absolute value thereof | % | — | 2.10 | 7.35 |
| | Appearance (visual observation) Fluctuation in color shade | — | Unable to produce prepreg | Unsatisfactory | Unsatisfactory |
| | Appearance (visual observation) Fluctuation in orientation of carbon filaments | — | Unable to produce prepreg | Unsatisfactory | Unsatisfactory |
| Molding | Appearance (visual observation) | — | — | Unsatisfactory | Unsatisfactory |

TABLE 5

| Item | | Unit | Comparative example 4 | Comparative example 5 | Comparative example 6 |
|---|---|---|---|---|---|
| Carbon fiber | Tensile strength | MPa | 5490 | 5490 | 5490 |
| | Elastic modulus | GPa | 295 | 295 | 295 |
| | Diameter | μm | 5.5 | 5.5 | 5.5 |
| | Weight per unit length | tex | 250 | 250 | 250 |
| | Si/c | — | 0.00 | 0.00 | 0.00 |
| | Width | mm | 3.5 | 3.5 | 3.5 |
| | Ra | — | 2.5 | 2.5 | 2.5 |
| | Major axis/minor axis ratio | — | 1.03 | 1.03 | 1.03 |
| | Drape value | cm | 15.0 | 15.0 | 15.0 |
| Prepreg | Unit area weight of carbon fibers | g/m² | 55 | 30 | 150 |
| | Resin content | wt % | 10 | 35 | 33 |
| | Tension on carbon fiber bundle | cN/tex | 0.9 | 1.0 | 0.7 |
| | Number of spreader roll stages | — | 6 | 6 | 0 |
| | Widening rate per spreader roll stage | % | 2.7 | 8.0 | 0.0 |
| | Width of carbon fiber bundle prior to spreading | mm | 4.1 | 5.6 | not less than 1.7 |
| | Width of carbon fiber bundle after prepregging | mm | 4.5 | 8.3 | 1.7 |
| | Widening ratio | % | 91.1 | 67.0 | >100 |
| | CV value of cross-sectional numerical density of carbon filaments | % | 12.4 | 17.2 | 14.7 |
| | Percentage of filaments having angle of ±3° or more in absolute value thereof | % | 2.54 | 4.18 | 8.05 |
| | Appearance (visual observation) | Fluctuation in color shade | — | Unsatisfactory | Unsatisfactory | Unsatisfactory |
| | | Fluctuation in orientation of carbon filaments | — | Unsatisfactory | Unsatisfactory | Unsatisfactory |
| Molding | Appearance (visual observation) | — | Unsatisfactory | Unsatisfactory | Unsatisfactory |

TABLE 6

| Item | | Unit | Comparative example 7 | Comparative example 8 | Comparative example 9 |
|---|---|---|---|---|---|
| Carbon fiber | Tensile strength | MPa | 5490 | 5490 | 5490 |
| | Elastic modulus | GPa | 295 | 295 | 295 |
| | Diameter | μm | 5.5 | 5.5 | 5.5 |
| | Weight per unit length | tex | 250 | 250 | 250 |
| | Si/c | — | 0.00 | 0.00 | 0.00 |
| | Width | mm | 3.5 | 3.5 | 3.5 |
| | Ra | — | 2.5 | 2.5 | 2.5 |
| | Major axis/minor axis ratio | — | 1.03 | 1.03 | 1.03 |
| | Drape value | cm | 15.0 | 15.0 | 15.0 |
| Prepreg | Unit area weight of carbon fibers | g/m² | 55 | 55 | 40 |
| | Resin content | wt % | 40 | 40 | 40 |
| | Tension on carbon fiber bundle | cN/tex | 0.1 | 10.0 | 1.5 |
| | Number of spreader roll stages | — | 6 | 6 | 6 |
| | Widening rate per spreader roll stage | % | 2.2 | 3.5 | 3.1 |
| | Width of carbon fiber bundle prior to spreading | mm | 4.0 | 4.3 | 4.2 |
| | Width of carbon fiber bundle after prepregging | mm | 4.5 | 4.5 | 6.3 |
| | Widening ratio | % | 88.9 | 95.6 | 66.7 |
| | CV value of cross-sectional numerical density of carbon filaments | % | 13.5 | 14.2 | 16.5 |
| | Percentage of filaments having angle of ±3° or more in absolute value thereof | % | 2.75 | 9.38 | 3.28 |

TABLE 6-continued

| | Item | | Unit | Comparative example 7 | Comparative example 8 | Comparative example 9 |
|---|---|---|---|---|---|---|
| | Appearance (visual observation) | Fluctuation in color shade | — | Unsatisfactory | Unsatisfactory | Unsatisfactory |
| | | Fluctuation in orientation of carbon filaments | — | Unsatisfactory | Unsatisfactory | Unsatisfactory |
| Molding | Appearance (visual observation) | | — | Unsatisfactory | Unsatisfactory | Unsatisfactory |

TABLE 7

| | Item | Unit | Comparative example 10 | Comparative example 11 |
|---|---|---|---|---|
| Carbon fiber | Tensile strength | MPa | 3530 | 4400 |
| | Elastic modulus | GPa | 235 | 378 |
| | Diameter | μm | 6.9 | 5.2 |
| | Weight per unit length | tex | 400 | 225 |
| | Si/c | — | 0.01 | 0.00 |
| | Width | mm | 2.6 | 2.3 |
| | Ra | — | 30.0 | 25.0 |
| | Major axis/minor axis ratio | — | 1.18 | 1.60 |
| | Drape value | cm | 18.5 | 17.8 |
| Prepreg | Unit area weight of carbon fibers | g/m² | 75 | 75 |
| | Resin content | wt % | 33 | 33 |
| | Tension on carbon fiber bundle | cN/tex | 0.9 | 1.1 |
| | Number of spreader roll stages | — | 9 | 6 |
| | Widening rate per spreader roll stage | % | 7.0 | 3.3 |
| | Width of carbon fiber bundle prior to spreading | mm | 4.8 | 2.8 |
| | Width of carbon fiber bundle after prepregging | mm | 5.3 | 3.0 |
| | Widening ratio | % | 90.6 | 93.3 |
| | CV value of cross-sectional numerical density of carbon filaments | % | 15.5 | 16.8 |
| | Percentage of filaments having angle of ±3° or more in absolute value thereof | % | 4.91 | 7.22 |
| | Appearance (visual observation) | Fluctuation in color shade | — | Unsatisfactory | Unsatisfactory |
| | | Fluctuation in orientation of carbon filaments | — | Unsatisfactory | Unsatisfactory |
| Molding | Appearance (visual observation) | | — | Unsatisfactory | Unsatisfactory |

INDUSTRIAL APPLICABILITY

The present invention gives a good external appearance to carbon fiber composite materials, improves the design performance of carbon fiber composite materials (moldings), such as those for sports, industrial and aircraft applications, and provides lightweight carbon fiber composite materials (moldings) through simplified coating.

REFERENCE SIGNS LIST

1: Creeling unit
2: Fiber bundle to be measured
3: Fixed guide bar
4: End-of-widening point
5: Winder
6: Carbon fiber sheet
7a, 7b: Lead-in roll
8: Heater
9a, 9b: Impregnating roll
10a, 10b: Draw-off roll
11: Take-up device
12: Prepregging resin sheet
13: Release paper
21: Specimen anchoring jig
30: Drape value measuring equipment
31: Base
40: Prepregging equipment
41: Pass line
42: Laminated sheet comprising carbon fiber sheet, prepregging resin sheet and release
43: Carbon fiber prepreg
A: Quadrangular prism
F: Carbon fiber bundle
FP: Drape value measurement piece
W: Weight

The invention claimed is:

1. A carbon fiber prepreg which comprises carbon fiber bundles composed of numerous carbon filaments and a matrix resin impregnated into the carbon fiber bundles,
wherein a percentage variation coefficient of the number of the carbon filaments contained in a unit area having the depth of 30 μm from a surface of the carbon fiber prepreg and the width of 100 μm in a cut surface formed by cutting the carbon fiber prepreg perpendicularly to the orientation of the carbon fiber bundles is 10% or less;
wherein a unit area weight of the carbon fibers in the carbon fiber prepreg is in the range of 30 g/m² to 80 g/m², and
wherein the matrix resin content of the carbon fiber prepreg is in the range of 15 mass to 50 mass %; and
wherein said carbon fiber prepreg is made by a method comprising a step for widening the carbon fiber bundles in the range of 80 to 98% of the target width prior to the impregnation of the carbon fiber bundles with the matrix resin by means of a drawing together of the numerous carbon filaments contained in the carbon fiber bundles by applying a tension in the range of 0.3 to 6 cN/tex to the carbon fiber bundles, and the widening rate per roll stage of a carbon fiber bundle is on average 10% or less.

2. The carbon fiber prepreg according to claim 1 which comprises carbon fiber bundles composed of numerous carbon filaments and a matrix resin impregnated into the carbon fiber bundles, wherein the projected area of the carbon filaments having a fiber orientation angle of 0°±3° or more in absolute value thereof is 2% or less of the projected area of all of the carbon filaments.

3. The carbon fiber prepreg according to claim 1, wherein the projected area of the carbon filaments having a fiber orientation angle of 0°±3° or more in absolute value thereof is 2% or less of the projected area of all of the carbon filaments.

4. The carbon fiber prepreg according to claim 2, wherein the projected area of the carbon filaments having a fiber orientation angle of 0°±3° or more in absolute value thereof is 0.8% or less of the projected area of all of the carbon filaments.

5. The carbon fiber prepreg according to claim 1, wherein the major axis/minor axis ratio of the carbon filaments is in the range of 1.00 to 1.10 and the degree of surface smoothness of the carbon filaments is 20 or less.

6. The carbon fiber prepreg according to claim 1, wherein the ratio between the number of Si atoms and that of C atoms in the surface of the carbon filaments is 0.01 or less.

7. The carbon fiber prepreg according to claim 1, wherein the matrix resin is an epoxy resin composition.

8. The carbon fiber prepreg according to claim 1, wherein the tension applied to the carbon fiber bundles is in the range of 0.5 to 6 cN/tex.

9. The carbon fiber prepreg according to claim 1, wherein the degree of fiber entanglement of the carbon fiber bundles is 10 or less.

10. The carbon fiber prepreg according to claim 1, wherein the drape value of the carbon fiber bundles is in the range of 5 cm to 18 cm.

11. A carbon fiber reinforced composite material produced by curing the matrix resin existing in the carbon fiber prepreg as defined in claim 1.

12. The carbon fiber prepreg according to claim 3, wherein the projected area of the carbon filaments having a fiber orientation angle of 0°±3° or more in absolute value thereof is 0.8% or less of the projected area of all of the carbon filaments.

13. The carbon fiber prepreg according to claim 2, wherein the major axis/minor axis ratio of the carbon filaments is in the range of 1.00 to 1.10 and the degree of surface smoothness of the carbon filaments is 20 or less.

14. The carbon fiber prepreg according to claim 2, wherein the ratio between the number of Si atoms and that of C atoms in the surface of the carbon filaments is 0.01 or less.

15. The carbon fiber prepreg according to claim 2, wherein a unit area weight of the carbon fibers in the carbon fiber prepreg is in the range of 30 g/m² to 100 g/m².

16. The carbon fiber prepreg according to claim 2, wherein the matrix resin content of the carbon fiber prepreg is in the range of 15 mass % to 50 mass %.

17. The carbon fiber prepreg according to claim 2, wherein the matrix resin is an epoxy resin composition.

* * * * *